(12) United States Patent
Berruyer

(10) Patent No.: US 9,581,703 B2
(45) Date of Patent: Feb. 28, 2017

(54) PHOTONIC SPECTROMETRY DEVICE, CORRESPONDING METHOD, AND USE OF THE DEVICE

(75) Inventor: Eric Berruyer, Loriol sur Drome (FR)

(73) Assignee: AREVA NP, Courbevoie (FR)

( * ) Notice: Subject to any disclaimer, the term of this patent is extended or adjusted under 35 U.S.C. 154(b) by 432 days.

(21) Appl. No.: 14/005,006

(22) PCT Filed: Mar. 12, 2012

(86) PCT No.: PCT/EP2012/054222
§ 371 (c)(1),
(2), (4) Date: Sep. 13, 2013

(87) PCT Pub. No.: WO2012/123392
PCT Pub. Date: Sep. 20, 2012

(65) Prior Publication Data
US 2014/0003580 A1    Jan. 2, 2014

(30) Foreign Application Priority Data

Mar. 14, 2011 (FR) ..................................... 11 52071

(51) Int. Cl.
*G01T 1/36* (2006.01)
*G01T 1/40* (2006.01)
*G01T 7/00* (2006.01)

(52) U.S. Cl.
CPC .................. *G01T 1/36* (2013.01); *G01T 1/40* (2013.01); *G01T 7/005* (2013.01)

(58) Field of Classification Search
CPC .............. G01T 1/36; G01T 1/40; G01T 7/005
See application file for complete search history.

(56) References Cited

U.S. PATENT DOCUMENTS

| 3,009,062 A | 11/1961 | Brooksbank, Jr. et al. |
| 3,124,679 A | 3/1964 | Tittman et al. |

(Continued)

FOREIGN PATENT DOCUMENTS

| EP | 0256902 A2 | 2/1988 |
| EP | 1927995 A2 | 6/2008 |

(Continued)

OTHER PUBLICATIONS

Alyoshin V et al.: "Multicrystal Low-Background Gamma-Spectrometer," Nuclear Instruments & Methods in Physics Research, North-Holland Publishing Company, Amsterdam, NL vol. 197. No. 2/3, Jun. 1, 1982 (Jun. 1, 1982), pp. 341-346, XP001440349, ISSN: 0167-5087.

(Continued)

*Primary Examiner* — David Porta
*Assistant Examiner* — Faye Boosalis
(74) *Attorney, Agent, or Firm* — Davidson, Davidson & Kappel, LLC

(57) ABSTRACT

A photonic spectrometry device is provided. The photonic spectrometry device includes at least one sensor capable of detecting photons, at least one photon-emitting calibrating source having a reference spectral line, and processing means capable of providing, for the or each sensor, a measurement spectrum corresponding to the measurements, made by the or each sensor, of the radiation from a product during a time interval, and establishing, on the basis of the or each measurement spectrum, a net corrected spectrum according to a measured characteristic line corresponding to the or each calibrating source. The or each calibrating source is positioned outside the or each sensor.

15 Claims, 6 Drawing Sheets

(56) References Cited

U.S. PATENT DOCUMENTS

| | | |
|---|---|---|
| 4,317,033 A | 2/1982 | Panenka et al. |
| 4,918,313 A | 4/1990 | Dubail et al. |
| 5,036,200 A | 7/1991 | Dubail et al. |
| 2009/0166539 A1 | 7/2009 | Ruan et al. |

FOREIGN PATENT DOCUMENTS

| | | |
|---|---|---|
| EP | 1956392 A1 | 8/2008 |
| EP | 2246711 A2 | 11/2010 |
| GB | 1226924 A | 3/1971 |
| GB | 2460159 A | 11/2009 |
| JP | 56-168579 A | 12/1981 |
| JP | 59-141086 A | 8/1984 |
| JP | 07-140252 A | 6/1995 |

OTHER PUBLICATIONS

Lin Lianqing et al.: "A NAI (Ti)—Plastic Anticoincidence Shield Low-Background Gamma Spectrometer," Radiation Protection, vol. 3. No. 5, Sep. 1983 (See English Abstract on last page).

Yin Jing-Peng et al.: "The Discussion on Synthesis Method of Array NAI(Ti) Detector y-Ray Spectrum," 2009 (See English Abstract on p. 5-7).

Guangxi Wang et al.: 2006, pp. 12-36 (See English Abstract on third page).

Guangxi Wang et al.: 2006, p. 191 and English translation thereof.

PHOTONIC SPECTROMETRY DEVICE, CORRESPONDING METHOD, AND USE OF THE DEVICE

The present invention relates to a photonic spectrometry device, of the type comprising at least one sensor capable of detecting photons, at least one photon-emitting calibrating source having a reference spectral line, and processing means capable of providing, for the or each sensor, a measurement spectrum corresponding to the measurements, made by the or each sensor, of the radiation from a product during a time interval and establishing, on the basis of the or each measurement spectrum, a net corrected spectrum according to a measured characteristic line corresponding to the or each calibrating source.

BACKGROUND

The production or recycling of nuclear fuel leads to the production of co-products, waste or effluents. It should be verified that the radioactive material content of these co-products, waste or effluents is acceptable in light of the regulatory thresholds.

For example, uranium oxide (UxOy), and in particular uranium dioxide ($UO_2$), is used as nuclear fuel. Uranium oxide is for example obtained by converting uranium hexafluoride ($UF_6$) into uranium oxide. The conversion is for example done first by countercurrent circulation of uranium hexafluoride powder and water ($H_2O$). Such a manufacturing method is described in FR 2,771,752.

This conversion generates hydrochloric acid (HF) as an exploitable co-product. It should be verified that the uranium concentration in the hydrochloric acid does not exceed the regulatory thresholds defined by the nuclear safety authority.

To that end, it is possible to take regular samples and have them analyzed by a laboratory, for example using mass spectrometry, a molecular absorption spectrophotometer, etc.

Nevertheless, such analyses require the use, by qualified personnel, of improved laboratory devices that are expensive to purchase, maintain and operate. They require a length of time that may vary from several tens of minutes to a day depending on the necessary preparations and the type of measurement done. They are done at regular, but separated time intervals. These analyses are poorly suited to monitoring a continuous industrial process and in that case require intermediate storage and processing by lots of certain steps of the industrial method.

SUMMARY OF THE INVENTION

One aim of the invention is to propose a photonic spectrometry device adapted to monitoring industrial processes.

To that end, the a photonic spectrometry device of the aforementioned type is provided, characterized in that the or each calibrating source is positioned outside the or each sensor.

According to other embodiments, the photonic spectrometry device comprises one or more of the following features, considered alone or according to all technically possible combinations:

it comprises at least two calibrating sources;
the processing means are configured to establish the or each net spectrum by recalibrating the corresponding measurement spectrum so as to have the measured characteristic line corresponding to the or each calibrating source coincide with its reference spectral line;
the processing means are configured to recalibrate the measurement spectrum of the or each sensor by at least one affine function, based on the recalibration of the measured characteristic line corresponding to the or each calibrating source;
it comprises several identical sensors;
each sensor receives statistically substantially a same quantity of photons coming from the or each calibrating source for a same time interval;
the sensors of the spectrometers are positioned in a circle;
the sensors are regularly distributed around the circle;
a measuring pot for circulating the fluid inside the pot, the pot comprising, outside the pot, a housing for receiving the or each calibrating source and a housing for respectively receiving the or each sensor;
two calibrating sources having different reference spectral lines, in particular reference spectral lines framing a spectral line that is characteristic of an element to be detected, in particular uranium 235.

A photonic spectrometry method is also provided comprising the following steps:

establishing a measurement spectrum from measurement signals provided by a photon-sensitive sensor in the presence of a product emitting radiation and at least two calibrating sources having different reference spectral lines;
establishing a net spectrum by recalibrating the measurement spectrum based on the spectral lines of the measurement spectrum corresponding to each calibrating source.

A photonic spectrometry method is also provided, comprising the following steps:

simultaneously measuring the radiation using several photon-sensitive identical sensors in the presence of a same product emitting radiation and at least one calibrating source shared by the sensors;
establishing a respective measurement spectrum from measurement signals provided by each sensor;
establishing a corrected net spectrum from each measurement spectrum by recalibrating each measurement spectrum so as to have the measured spectral line corresponding to the or each calibrating source coincide with the reference spectral line of the or each calibrating source.

According to one embodiment of the aforementioned methods, the radiation is measured in the presence of two calibrating sources, and each elementary spectrum is established by recalibrating the or each measurement spectrum using at least one affine function, based on the recalibration of each calibrating source.

According to one embodiment of the aforementioned methods, a global spectrum is established as the summation of net spectrums obtained by recalibrating the measurement spectrums established through simultaneous measurements of a same product emitting radiation during the same time interval by several identical sensors.

A use of a photonic spectrometry device as defined above is also provided to measure the uranium content of hydrofluoric acid resulting from the manufacture of uranium oxide, to measure the content level of at least one radioisotope of the effluents of a radioactive recycling facility or to measure, before discharge, the content level of at least one radioisotope of the effluents of a radioactive material treatment plant.

BRIEF SUMMARY OF THE DRAWINGS

The invention and the advantages thereof will be better understood upon reading the following description, provided solely as an example, and done in reference to the appended drawings, in which.

DETAILED DESCRIPTION

Figure 1:
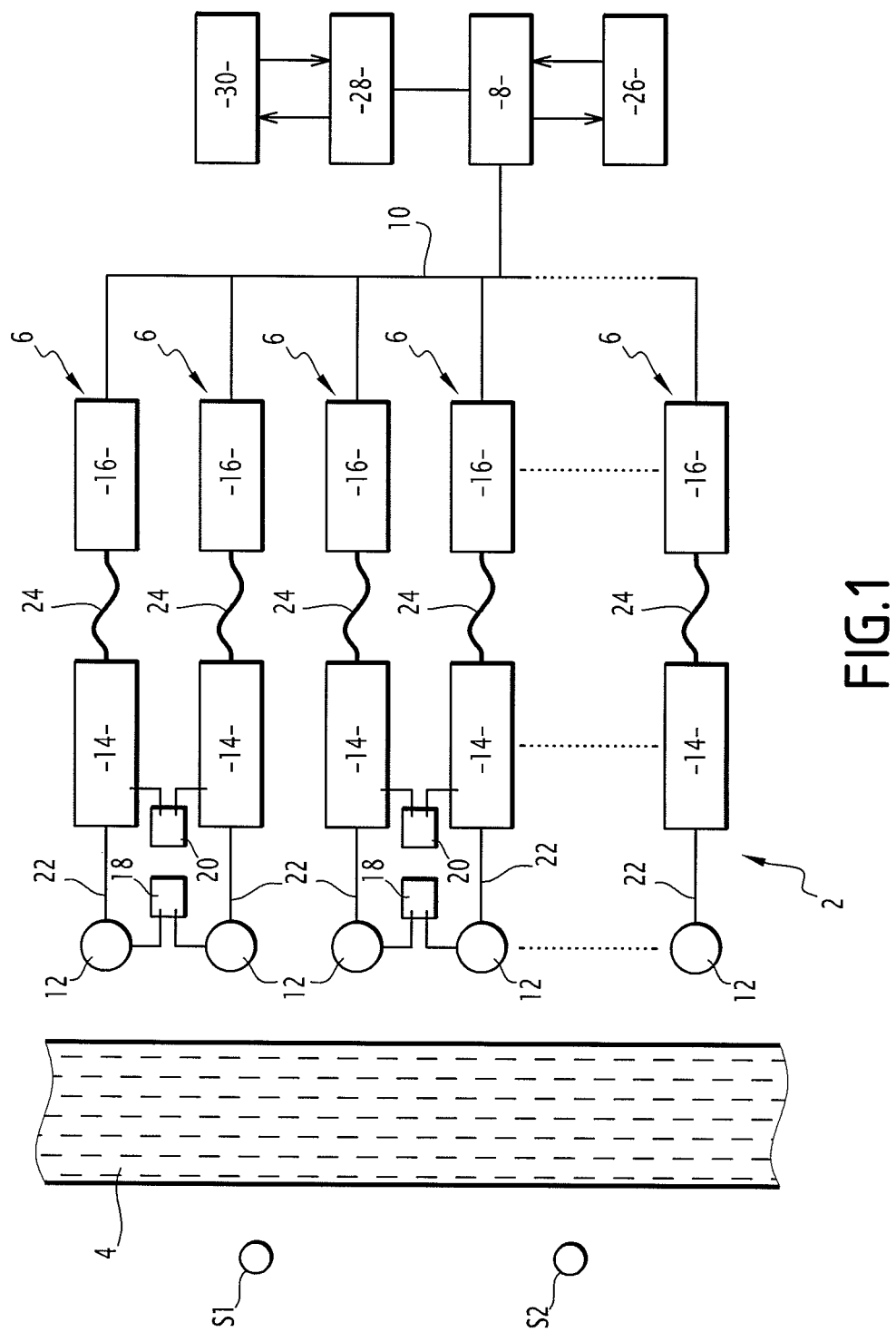
FIG. 1 is a diagrammatic view illustrating a photonic spectrometry device according to an embodiment of the invention.

The photonic spectrometry device 2 illustrated in FIG. 1 is capable of measuring the radiation emitted by a product 4.

The photonic spectrometry device 2 comprises several photonic spectrometers 6 and an electronic processing module 8, hereafter "processing module". The photonic spectrometry device 2 comprises a data sharing bus 10 connecting the processing module 8 to the outlet of each spectrometer 6.

Each spectrometer 6 is capable of establishing a spectrum of the number of detected photons during a time interval or measurement interval, based on the energy of the detected photons. Each spectrometer 6 is designed to ensure the linearity of its response (energy spectrum) relative to the information presented at its input (energy of each photon).

Each spectrometer 6 comprises a single radiation sensor 12, an electronic detection and quantification module 14, hereafter "detection module", and an electronic analysis module 16, hereafter "analysis module", which are associated.

The sensor 12 is capable of detecting gamma photons, also called gamma rays, and/or X photons, also called X rays, and emitting, for each detected photon, an electrical output signal proportional to the energy of the detected photon. The sensor 12 is supplied with electrical energy by a high-voltage electrical energy source 18.

The detection module 14 receives, as input, the output signal from the associated sensor 12 and delivers, as output, a digital signal representative of the value of the energy of each photon detected by the sensor 12. The detection module 14 is supplied with electrical energy by a low-voltage electrical energy source 20.

The analysis module 16 is capable of counting the signals emitted by the detection module 14, each signal corresponding to a photon detected by the sensor 12, and establishing a measurement spectrum of the quantity of photons detected by the sensor 12 based on the energy (keV) for a measurement interval.

The sensor 12, the detection module 14 and the analysis module 16 are separated and connected to each other by data transmission links. The sensor 12 provides an electrical signal as output. The improved detection module 14 is connected to the sensor output 12 by wired link 22. The detection module 14 emits an optical digital output signal.

The input of the analysis module 16 is connected to the output of the detection module 14 by an optical link 24, of the fiber-optic type.

The spectrometers 6 are capable operating simultaneously and simultaneously processing the photons emitted by the product 4.

The processing module 8 is connected to the output of each spectrometer 6 by the bus 10. The processing module 8 is configured to perform a specific processing of the measurement spectrums simultaneously acquired on the same time interval and established by the spectrometers 6 so as to be able to deliver a representative global spectrum determined from the set of measurement spectrums.

The processing module 8 is connected to a man/machine interface 26 to display results and/or receive instructions.

The processing module 8 is connected to a control unit 28 capable of using the result provided by the processing module 8 to control a facility 30, for example a facility for producing or recycling nuclear fuel or a facility for discharging effluents from a plant for producing and/or recycling nuclear fuel.

The spectrometers 6 are identical. The sensors 12 of the spectrometers 6 are identical, the detection modules 14 of the spectrometers 6 are identical, and the analysis modules 16 of the spectrometers 6 are identical.

Figure 2:
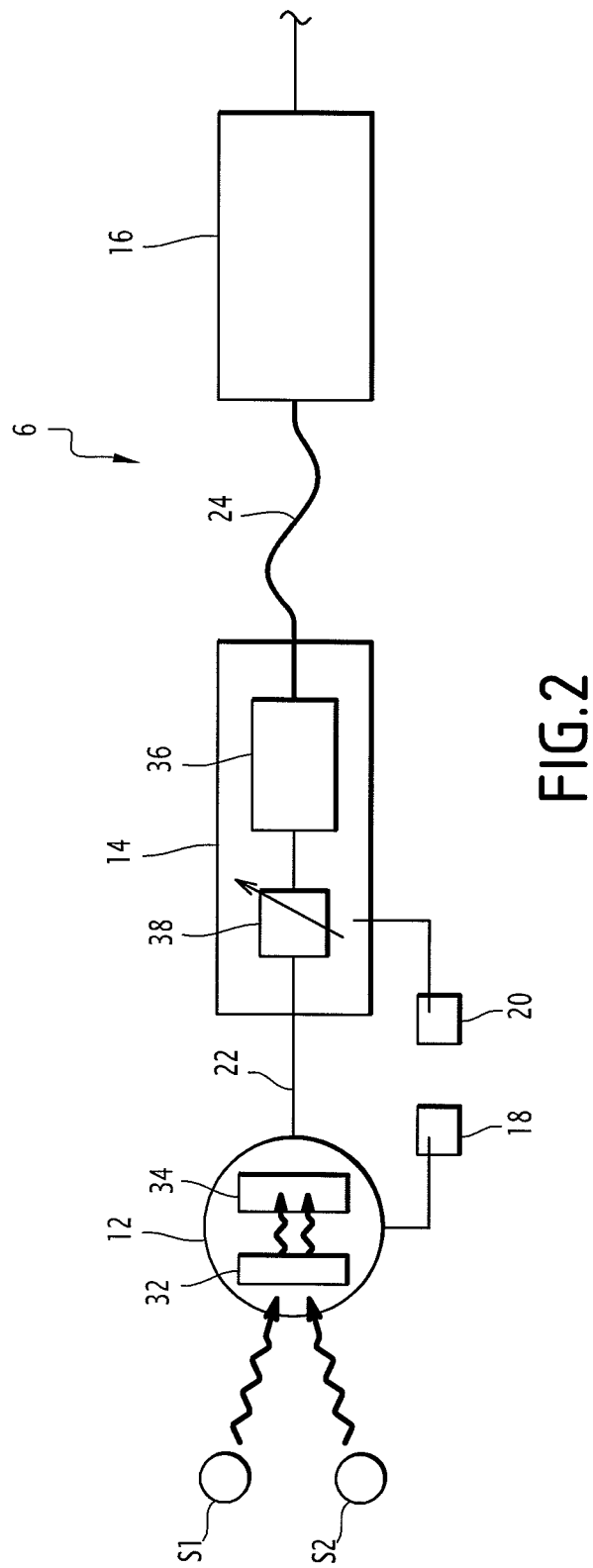
FIG. 2 is a diagrammatic view of a photonic spectrometer of the photonic spectrometry device of FIG. 1.

As shown in FIG. 2 illustrating a spectrometer 6, the sensor 12 of each spectrometer 6 is a scintillation sensor. It comprises a scintillating crystal 32, for example an inorganic scintillator of the doped alkali halide type, for example such as NaI(TI), or of the mineral compound type, such as $LaBr_3(Ce)$, and a photomultiplier 34 optically coupled to the crystal 32. When a photon is absorbed by the crystal 32, the latter emits a light signal whereof the energy is proportional to that of the absorbed photon. The photomultiplier 34 delivers an electrical signal as output that is proportional to the light energy emitted by the crystal 32.

The sensor 12 therefore delivers, as output, an analog electrical signal proportional to the energy released by the photon in the crystal 32.

The detection module 14 comprises an analog/digital converter 36 for converting the analog input signal into a digital output signal.

The detection module 14 is adjustable so as to adjust the output signal of the detection module 14 based on the input signal that it receives. To that end, the detection module 14 comprises a proportional regulator 38 capable of applying a multiplication coefficient to the signal that it receives. The proportional regulator 38 is adjustable so as to be able to regulate the multiplier coefficient.

Returning to FIG. 1, the photonic spectrometry device 2 comprises at least one calibrating source, and preferably at least two calibrating sources S1, S2 associated with the plurality of spectrometers 6. Each calibrating source S1, S2 emits a determined photon spectrum. The calibrating sources S1, S2 emit different photon spectrums. Preferably, each calibrating source S1, S2 emits a spectrum having a characteristic spectral line around a reference energy or a reference line, and the calibrating sources S1, S2 have one or more reference lines at different reference energies.

The calibrating sources S1, S2 are positioned so as to ensure identical radiation of each sensor 12 of each spectrometer 6. For example, to ensure identical radiation, each calibrating source S1, S2 is positioned at an equal distance from the sensors 12 of the spectrometers 6. In other words, the spectrometers 6 use at least one shared calibrating source S1, S2, preferably two shared calibrating sources S1, S2.

The calibrating sources S1, S2 are separated from the spectrometers 6, and in particular from the sensor 12 of each spectrometer 6. Each spectrometer 6 is therefore associated with at least one calibrating source S1, S2 separated from the sensor 12 of that spectrometer 6, preferably two calibrating sources S1, S2 separated from the sensor 12 of said spectrometer 6.

The processing module 8 is capable of individually analyzing each measurement spectrum during a given measurement interval so as to compare, for each spectrometer 6, the measured characteristic spectral line corresponding to each calibrating source S1, S2 to the corresponding reference line, calculating the constants of the affine functions to be applied to make the measured characteristic spectral lines of the sources S1, S2 coincide with their reference lines, applying the affine functions of all points of the spectral domain to recalibrate the measurement spectrum and thereby determine the corresponding net spectrum, and lastly adding the net spectrum resulting from each of the spectrometers 6 to obtain the global spectrum.

The recalibration is done in energy and/or efficiency. The energy recalibration consists of determining an affine function to make the energy of the measured characteristic spectral line corresponding to the or each calibrating source S1 and S2 correspond to the energy of the reference line of the or each calibrating source S1, S2. The efficiency recalibration consists of determining an affine function to make the number of detected photons of the measured characteristic spectral line corresponding to the or each calibrating source S1 and S2 correspond to the expected number of photons—corresponding to the initial detection efficiency of the sensor 12 of the photonic spectrometer 6—during the measurement interval.

The processing module 8 receiving the measurement spectrums and/or the analysis modules 16 establishing the measurement spectrums is/are advantageously capable of storing them at least temporarily. This makes it possible to consult the measurement spectrums for example for quantification or verification purposes or in case of anomaly or operating incident.

Processing means are formed by the processing module 8 capable of determining a net spectrum from each of the measurement spectrums provided by the spectrometers 6 and determining a global spectrum resulting from adding the net spectrums.

In one alternative, the analysis module 16 of each spectrometer 6 is capable of establishing the measurement spectrum and performing its processing to determine the corresponding net spectrum. In that case, the processing means are formed by the analysis modules 16 of each spectrometer 6 and by the processing module 8, which receives the net spectrums determined by the analysis modules 16 and adds them to obtain the global spectrum.

Figure 3:
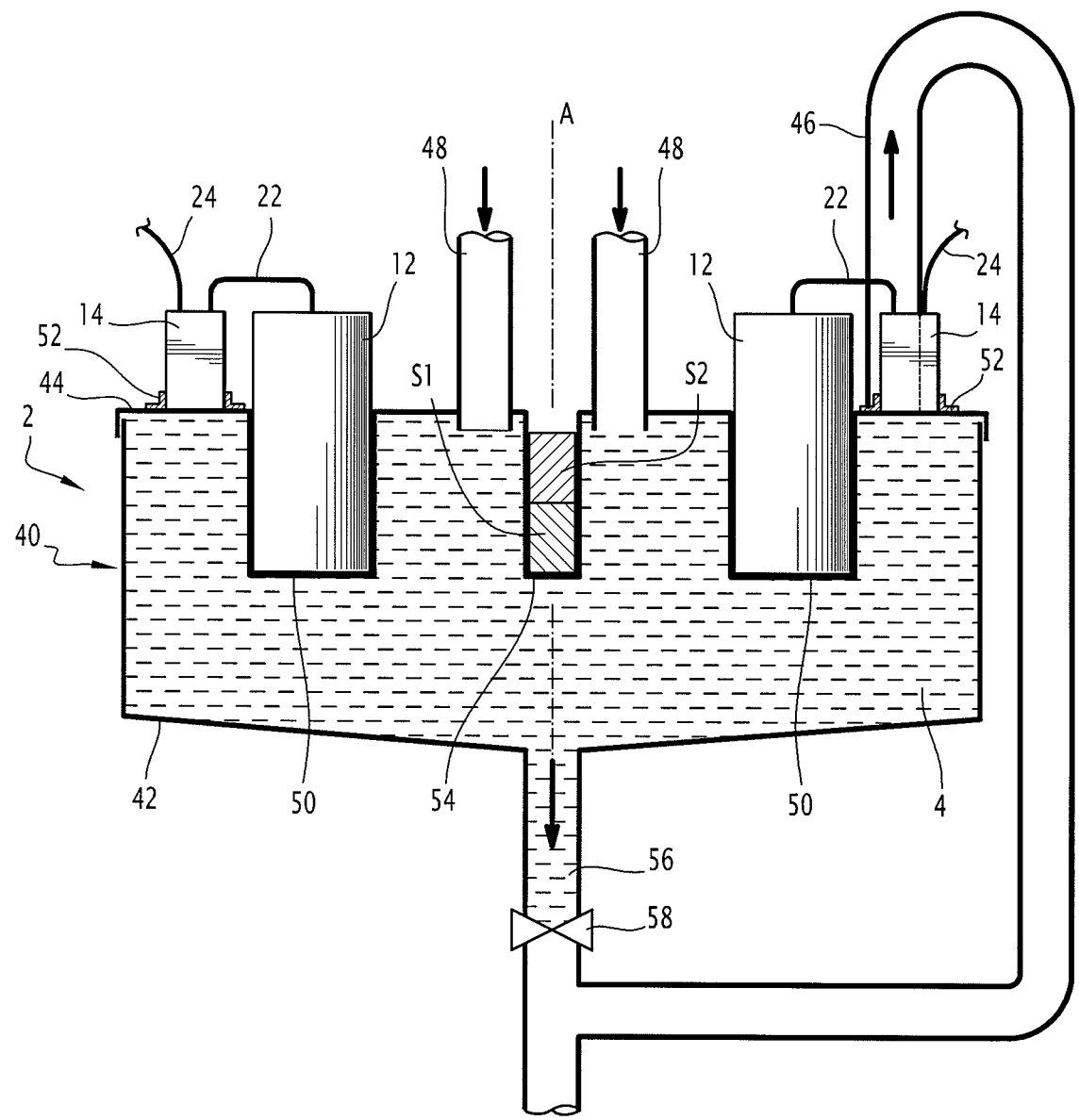
FIGS. 3 and 4 are cross-sectional and top views of a detection assembly of the device of FIG. 1.
Figure 4:
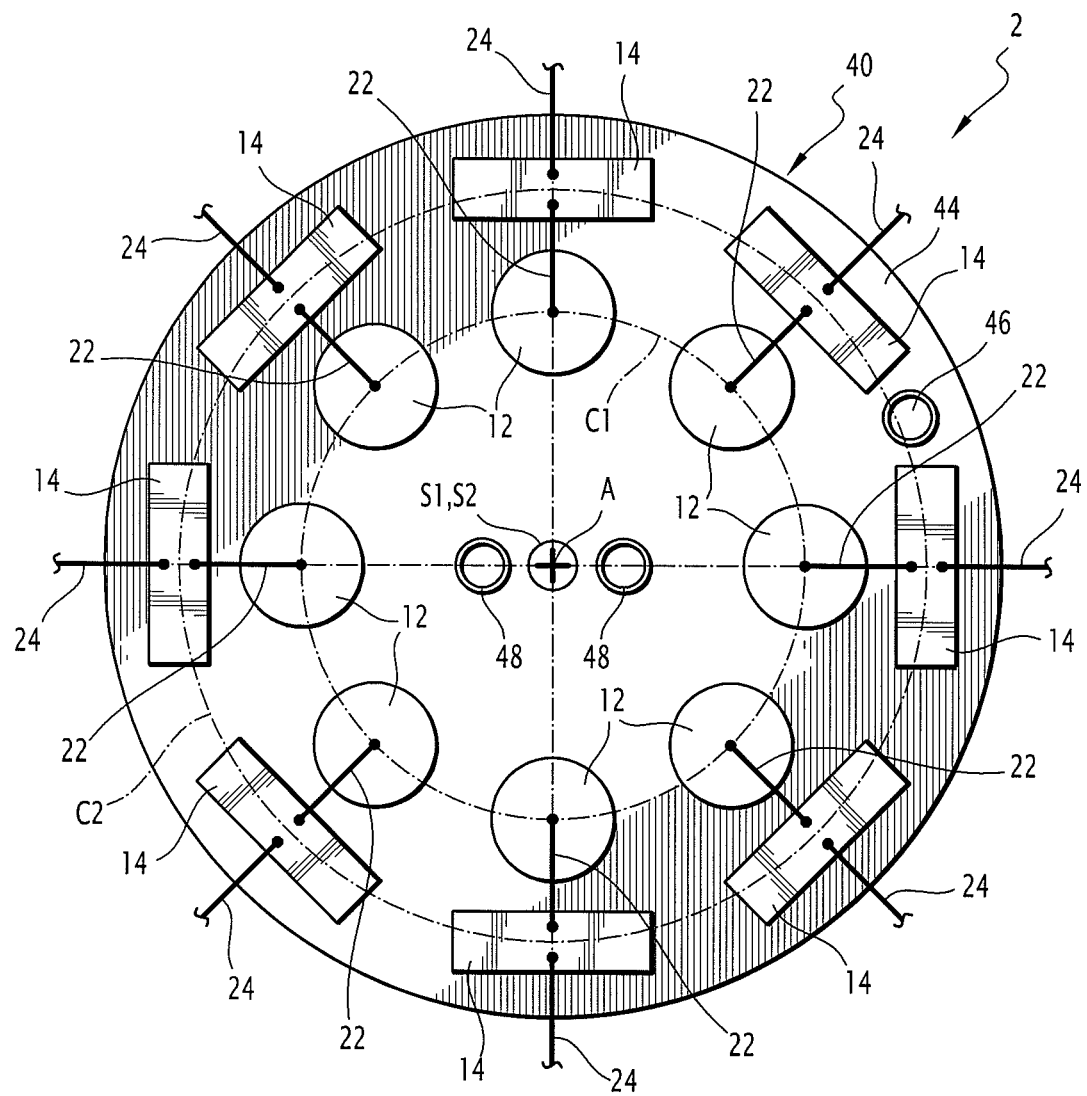

As illustrated in FIGS. 3 and 4, the sensors 12 are regularly distributed in an imaginary circle of sensors C1 centered on an axis of symmetry A. As illustrated in FIG. 4, there are 8 sensors 12 that are distributed around the axis A, with the same metric radius value and following a regular angular pitch equal to 45°.

The calibrating sources S1, S2 are positioned at the center of the sensor circle C1. Each calibrating source S1, S2 is therefore situated at an equal distance from the sensors 12. As a result, each sensor 12 receives statistically substantially the same quantity of photons coming from the calibrating sources S1, S2, during a same measurement interval.

The photonic spectrometry device 2 comprises a pot 40 for circulating the product 4 to be monitored, having a symmetry of revolution around the axis of symmetry A. As a result, each sensor 12 receives statistically substantially the same quantity of photons coming from the product 4 present in the pot 40.

The sensors 12 are positioned on the pot 40 such that the space for receiving the product 4 in the pot 40 is situated between the sensors 12 and around the sensors 12. This ensures good radiation of the sensors 12 by the photons emitted by the product 4.

As illustrated in FIGS. 3 and 4, the pot 40 comprises a vat 42 with a circular section extending along the axis of symmetry A and a lid 44 with a circular contour closing the vat 42, hermetically if necessary.

The lid 44 has a generally circular shape. The lid 44 comprises at least one filling device 48 positioned near the center of the lid 44 coinciding with the axis A and ensuring rapid filling of the pot 40 and at least one pouring device 46 positioned on the periphery of the lid 44 and ensuring the discharge of the overflow from the pot 40. As illustrated in FIGS. 3 and 4, when several filling devices 48 are present, the filling devices 48 are spaced apart and regularly distributed in a circle centered on the axis A. Depending on the configuration of the facility 30, the filling device 48 may also be positioned on a side face or on the lower face of the vat 42.

The vat 42 comprises at least one emptying device 56 supplied from the lowest point of the vat 42 ensuring emptying of the pot 40 controlled by the discharge valve 58. As illustrated in FIG. 3, the vat 42 comprises an emptying device 56 supplied at the center of the bottom of the vat 42.

The lid 44 comprises a plurality of sensor cells 50 protruding toward the inside of the pot 40 and open toward the outside of the pot 40. Each sensor cell 50 defines a housing for receiving a sensor 12 in the lid 44. The sensor cells 50 are positioned along the sensor circle C1. The sensor cells 50 are regularly distributed around the axis A.

The lid 44 comprises a plurality of detection module 14 maintaining devices 52 open toward the outside of the pot 40. Each maintaining device 52 defines, protruding on the outside of the lid 44, a housing for receiving a detection module 14. The maintaining devices 52 are positioned along an imaginary circle of detection modules C2 centered on the axis A. The maintaining devices 52 are regularly angularly distributed around the axis A.

The lid 44 comprises a calibrating source cell 54 centered on the axis A. The calibrating source cell 54 is positioned between the filling devices 48. The calibrating sources S1, S2 are positioned in the calibrating source cell 54. Each calibrating source S1, S2 is situated at the center of the circle of sensors C1 along which the sensors 12 are positioned.

The pot 40 is positioned near a facility 30. The detection assembly formed by the measuring pot 40, the sensors 12 and their associated detection modules 14 is supplied with a product 4 to be monitored, directly or through a bypass (parallel path) of the facility 30.

The pot 40 is for example positioned at the output of a uranium and hydrochloric acid production furnace, on a liquid hydrochloric acid outlet, in a confined room.

The detection modules 14 positioned near the sensor 12 make it possible to use short wired links 22 between the detection modules 14 and the sensors 12, so as to maximize the signal-to-noise ratio during detection.

The analysis modules 16 associated with the detection modules 14 and the sensors 12 can be placed outside the confined room. The optical fiber optic link 24 transmits data with a high and reliable throughput over long distances, for example several tens of meters.

During operation, during a determined time interval, the spectrometers 6 simultaneously measure the photons emitted by the product 4 present in the measurement pot 40. Each spectrometer 6 provides a measurement spectrum. After individual recalibration of each measurement spectrum to determine a net spectrum, the processing module 8 adds the net spectrums to determine a global spectrum resulting from the addition of the net spectrums. From the global spectrum, the processing module 8 determines one or more measurements, for example a uranium 235 concentration in the product 4.

The photonic spectrometry device 2 makes it possible to replace the measurement done by laboratory equipment on a sample of the product 4 over a period of time T with n simultaneous measurements (n>1) on the product 4 leaving the facility 30, done by several spectrometers 6 while guaranteeing a result with the same statistical precision acquired over shorter length of time, which may for example be reduced to T/n.

The photonic spectrometry device 2 makes it possible to perform satisfactory measurements over a measurement interval of several minutes, for example from 1 to 5 minutes, whereas the traditional sampling and analysis techniques using laboratory equipment require several tens of minutes, or even several hours and, depending on the product be withdrawn, human intervention in a potentially hazardous environment such as a confined zone.

The photonic spectrometry device 2 therefore makes it possible to perform measurements very quickly, over a measurement interval compatible with the monitoring or control of an industrial process.

Nevertheless, spectrometry is a statistical type of measurement. All of the photons emitted by the product 4 during the measurement interval are not necessarily detected. Each sensor 12 detects only part of the photons that reach the sensor 12.

The principle of the addition of the measurements provided by different spectrometers 6 can only be considered physically justified if the photonic spectrometry device 2 verifies the principle of ergodicity.

This means in practice that the different paths for measuring a same size must be able to be considered identical or substantially identical so as to provide identical or substantially identical results under the same measuring conditions.

To meet this condition or at least come close enough to it, the photonic spectrometry device 2 comprises several identical spectrometers 6.

In fact, due to the inevitable manufacturing tolerances, the sensors 12, although identical, have a dispersion and, placed under the same conditions, provide different measurements.

The value of the signals provided by one sensor 12 also depends on its high-voltage power supply. Even a small modification in value relative to the voltage of the high-voltage power supply substantially modifies the value of the supplied signals. Adjusting the voltage individually for each sensor 12 could in theory make it possible to calibrate the sensors 12, but this individual adjustment requires a specific high-voltage electricity source 18 for each sensor 12 and is not industrial due to the significant maintenance it involves. To meet the constraints of an industrial method, it is preferable to keep a single high-voltage value, which optionally makes it possible to use a single high-voltage electricity source 18 for all of the sensors 12. All of the sensors 12 being powered by the same high-voltage value, the delivered signals will then be different due to the differences in gain and detection output of each sensor 12.

According to one aspect of the invention, the sensor 12 of each spectrometer 6 is coupled to the detection module 14 associated with that spectrometer 6. The sensor 12 and the associated detection module 14 are calibrated jointly.

According to one embodiment, the detection module 14 of each spectrometer 6 is initially adjusted such that the signals provided by the different sensor 12/detection module 14 pairs are identical and linear or substantially identical and linear under the same measuring conditions.

Advantageously, each sensor 12/detection module 14 pair is adjusted by adjusting the gain of the photomultiplier 34 coupled to the crystal 32 of the sensor 12, then adjusting the detection module 14, for example by adjusting the proportional regulator 38 of the detection module 14.

Thus, according to this embodiment of the invention, the adjustment is done at each sensor 12/detection module 14 pair, and not each sensor 12. This makes it possible to account for the dispersion between the sensors 12 and between the detection modules 14 and to ensure that each spectrometer 6 provides substantially the same net spectrum in the presence of a same radiation source.

The initial adjustment of each spectrometer 6 is for example done in the presence of at least one calibrating source S1, S2. The proportional regulator 38 of the detection module 14 is adjusted such that the output signals provided by the detection module 14 correspond to the expected values in the presence of the calibrating source S1, S2.

As a result, each sensor 12 and the detection module 14 associated therewith form an inseparable pair. Two detection modules 14 cannot be inverted without inverting the two associated sensors 12, and a sensor 12 cannot be replaced without associating its own detection module 14 with it.

The sensors 12 are powered by the same high-voltage value and are advantageously powered by the same high-voltage electricity source 18. This simplifies the power supply of the sensors 12 and maintenance operations. For reasons other than the redundancy principle implemented in nuclear facilities, as illustrated in FIG. 1, it is possible to provide a high-voltage electricity source 18 that is for example shared by two sensors 12. In FIG. 1, the spectrometers 6 are grouped in twos, the two sensors 12 of the spectrometers 6 of each group being powered by the same high-voltage electricity source 18.

Each sensor 12 may drift over time, and the sensors 12 may have different drifts.

According to one aspect of the invention, the photonic spectrometry device 2 comprises at least one calibrating source S1, S2 shared by the different spectrometers 6 to correct the drift of the sensors 12. The sensors 12 are positioned symmetrically around each calibrating source S1, S2. Thus, the drift correction of the sensors 12 is done from the same calibrating source S1, S2, which is an additional guarantee of compliance with the principle of ergodicity.

The drift of each sensor 12 is corrected by recalibrating each measurement spectrum based on the measured characteristic spectral line corresponding to the or each calibrating source S1, S2 and the reference line of the or each calibrating source S1, S2 so as to determine a net spectrum of the radiation emitted by the product 4 and the or each calibrating source S1, S2.

According to one aspect of the invention, the photonic spectrometry device 2 comprises at least one calibrating source S1 having a higher reference energy than that of an element to be detected.

The uranium 235 isotope has, inter alia, a characteristic gamma photon emission at the value of 185.7 keV. A photonic spectrometry device 2 suitable for detecting the uranium 235 isotope for example comprises a calibrating source made from cesium 137 having a reference characteristic gamma photon emission at the value of 662 keV, whereof the influence on the counts for the energy of 185.7 keV, i.e., the results of counting over the measurement interval provided by the analysis module 16, is easily made negligible.

By ensuring that each spectrometric path has a response linearity characteristic, it is possible to correct the measurement spectrum as a function of the difference between the value measured for a calibrating source and the reference value of the calibrating source. An error—in relative value— of X % on the measurement of the reference value of the calibrating source causes a correction—in relative value—of X % of all of the measured values.

As a result, a small measurement drift in absolute value on the reference energy of a calibrating source causes a greater correction in absolute value on all of the energy measurements higher than that of the calibrating source and a smaller correction in absolute value on all of the energy measurements lower than that of the calibrating source. This means that for a given measurement uncertainty, the uncertainty is higher for all of the energy measurements above that of the calibrating source and is lower for all of the energy measurements lower than that of the calibrating source.

Choosing a calibrating source with an energy higher than that of an element to be detected therefore makes it possible to minimize the measurement uncertainties in absolute value in the energy ranges corresponding to that of the element to be detected.

According to one aspect of the invention, the photonic spectrometry device 2 comprises two calibrating sources S1 and S2 having characteristic spectral lines with different reference energies.

Preferably, the reference energies of the calibrating sources S1 and S2 are chosen such that one of them as an emission energy situated at one of the two ends of the energy spectral analysis band of a spectrometer 6, and the other has an emission energy situated at the other end of the energy spectral analysis band of the same spectrometer 6. Thus, with two sources providing two different energies and as far apart as possible on the spectral analysis scale, the correction is optimal for all of the photons detectable on that energy analysis band.

The uranium 235 isotope has, inter alia, a characteristic gamma photon emission at the value of 185.7 keV. A photonic spectrometry device 2 suitable for detecting uranium 235 for example comprises a calibrating source made from americium 241 having a reference energy of 59.5 keV and therefore a reference line on the energy spectrum around the x-axis of 60 keV, and a calibrating source made from cesium 137 having a reference energy of 662 keV and therefore a reference line on the energy spectrum around the x-axis of 662 keV.

Figure 5:
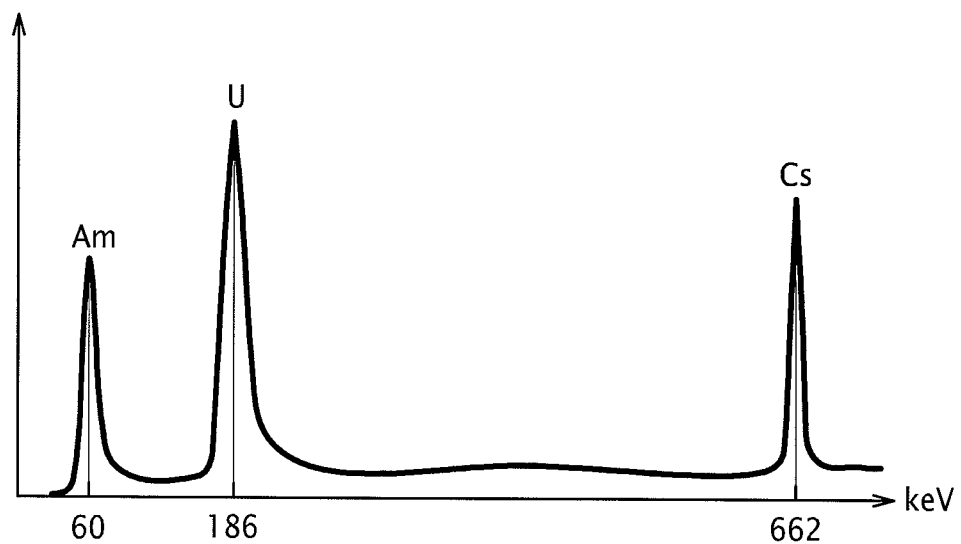
FIG. 5 is a diagram illustrating a spectrum obtained using a spectrometer of the photonic spectrometry device of FIG. 1.

FIG. 5 illustrates one example of the spectrum that can be obtained in the presence of an americium 241 calibrating source, a cesium 137 calibrating source and a sample containing uranium 235. The x-axis represents the energy in keV of the received photons, and the y-axis represents the number of photons detected.

The drift correction is done by correcting each measurement spectrum based on the measured characteristic spectral line and the reference line of each calibrating source S1, S2, which guarantees more precise correction.

The affine recalibration functions are determined such that the measured characteristic lines of the calibrating sources S1, S2 used coincide, in energy and counting, with the respective reference lines of the calibrating sources S1, S2 then applied to each point of the measurement spectrum.

Most of the photon sensors comprise a calibrating source—for example americium 241—placed in the sealed sensor or sealed to the crystal during the manufacture thereof. Subject to the laws on sealed sources, the calibrating sources have a limited regulatory lifetime. The source and therefore the sensor must be destroyed at the end of the regulatory lifetime, irrespective of the condition of the sensor, which limits the lifetime of the sensor. Likewise, if a sensor is defective, the entire sensor is replaced and the calibrating source is destroyed with the sensor.

Using a calibrating source associated with a sensor but physically separated from the sensor makes it possible to limit the production cost of the unit while limiting the cost of replacing a sensor and making it possible to keep the sensor even if the calibrating source must be replaced and vice versa. This further makes it possible to use the same calibrating source for several sensors, which makes it possible not only to limit the cost of the measuring assembly, but also to ensure better suitability for the ergodicity constraint of a device using several sensors at the same time.

In one embodiment, at least one recalibration function for recalibrating the measurement spectrums of a spectrometer 6 is determined for each measurement spectrum provided by the spectrometer 6. Alternatively, at least one recalibration function for recalibrating the measurement spectrums of a spectrometer 6 is determined from at least one reference measurement spectrum of the spectrometer 6 so as to cause, for each calibrating source S1, S2, a characteristic spectral line of the reference measurement spectrum to coincide with the reference spectral line of that calibrating source S1, S2. The or each recalibration function is used to recalibrate several successive measurement spectrums of the spectrometer 6. The or each recalibration function is determined periodically according to a frequency that depends on the stability of the spectrometer 6. The frequency may be a day, a week or more.

Figure 6:
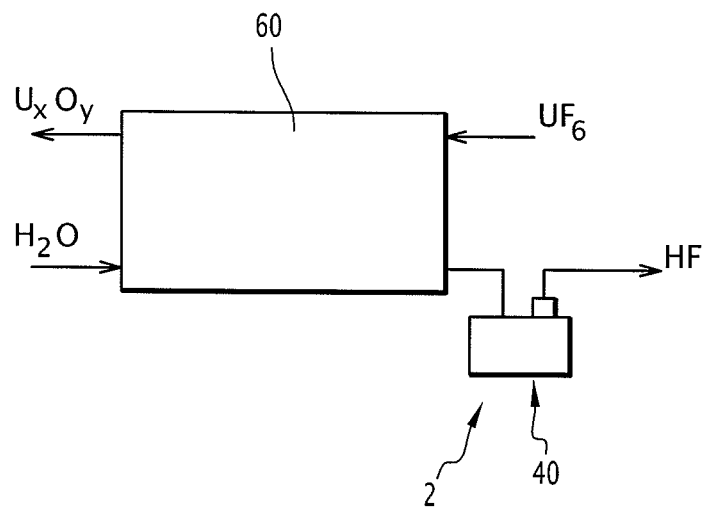
FIGS. 6 to 8 are diagrammatic views of facilities for producing or recycling nuclear fuel incorporating a photonic spectrometry device according to an embodiment of the invention.
Figure 7:
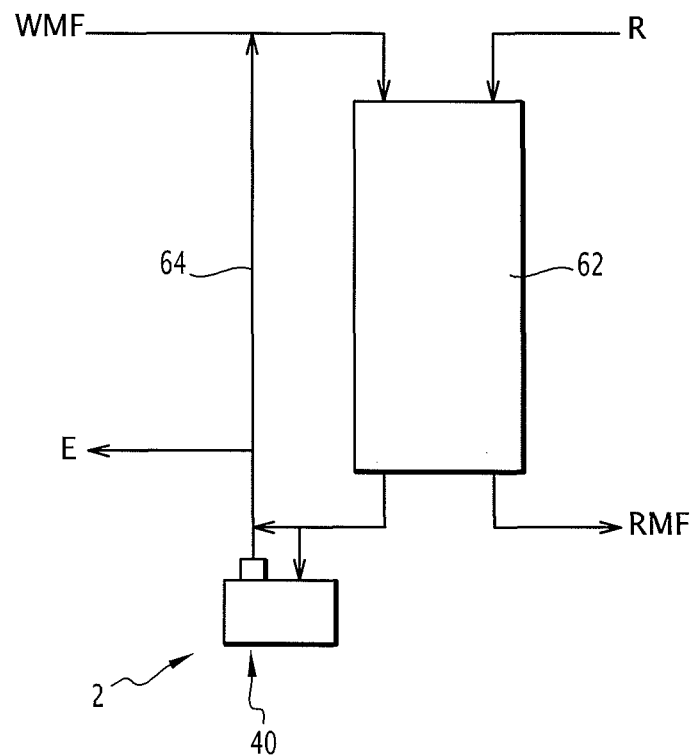
Figure 8:
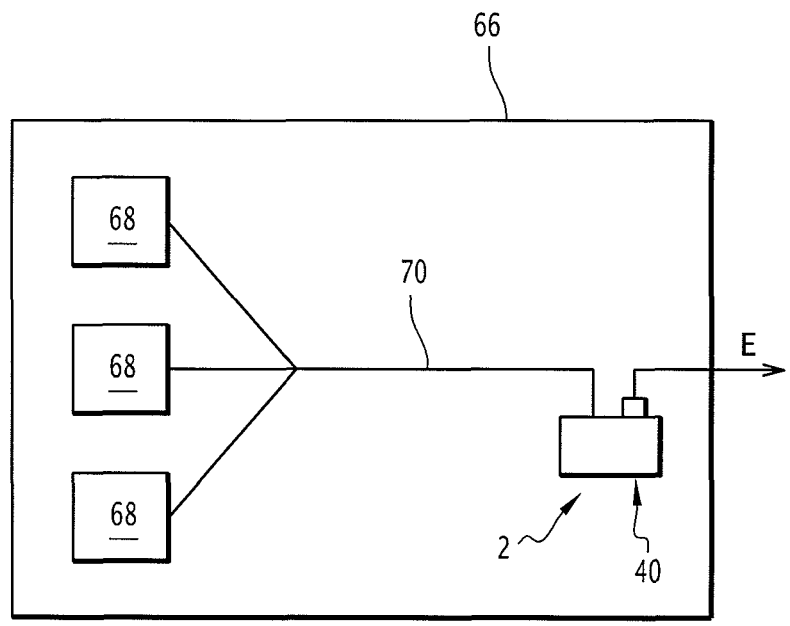

FIGS. 6 to 8 diagrammatically illustrate industrial facilities 30 using a photonic spectrometry device 2 to monitor the radioisotope content level of co-products and waste effluent.

FIG. 6 illustrates a facility for converting uranium hexafluoride into uranium oxide comprising a furnace 60 receiving, inter alia, at the input, uranium hexafluoride $UF_6$ and water $H_2O$ circulating countercurrent in the furnace 60, and providing, at the output, uranium oxide $U_xO_y$ as the product and hydrofluoric acid HF as the co-product.

As illustrated, the pot 40 of the photonic spectrometry device 2 is positioned serially on a hydrofluoric acid output after liquid HF condensation so as to verify that the content level of the hydrofluoric acid in the uranium 235 is below the regulatory thresholds.

FIG. 7 illustrates a facility for recycling radioactive materials comprising a reactor 62 receiving waste as input containing radioactive material WMF and reagents R capable of precipitating the radioactive material, and providing as output recycled radioactive material RMF and effluents E.

As illustrated, the pot 40 of the photonic spectrometry device 2 is positioned on a bypass (parallel) on an effluent E output so as to verify that the radioisotope content level of the effluents E, for example certain radioisotopes of thorium, uranium 235, lead 212, etc., or other radioactive impurities for example resulting from the implementation of uranium from the processing of radiated fuels, called reprocessed uranium, plutonium, etc. is below the regulatory thresholds.

The recycling facility comprises a recirculation duct 64 extending between the output of the measuring pot 40 of the photonic spectrometry device 2 and the waste input WMF, such that the effluents E are recycled as long as they have an excessive content level of one or more radioisotopes.

FIG. 8 illustrates an assembly for processing radioactive materials 66 comprising several facilities 68 reprocessing radioactive materials producing effluents E, collected in a discharge circuit to be discharged.

The photonic spectrometry device 2 is positioned in the discharge circuit so as to verify that the collected effluents E have a radioisotope content level in compliance with the regulatory discharge thresholds.

The photonic spectrometry device 2 is installed in a primary duct 70 to perform the measurements on all of the effluents E or on a bypass duct to perform the measurements on a fraction of the collected effluents E.

It is possible to use the photonic spectrometry device 2 so as to determine the origin of the pollution of the effluents by the radioactive material. In fact, based on the industrial process at the source for example of uranium pollution, chemical elements characteristic of the implemented process may be associated with uranium. For example, a presence of lead 212 associated with uranium 235 indicates pollution coming from a facility using reprocessed uranium.

Thus, according to one aspect of the invention, the processing module 8 of the photonic spectrometry device 2 is configured to determine, from the global spectrum, the presence of radioisotopes in addition, for example, to uranium 235.

Generally, the choice of the limitation of the photonic spectrometry device 2 in series or in bypass on an output of the product 4 to be monitored depends on the facility 30 and the flow rate of the product on the output line.

According to one option, the processing module 8 comprises a memory in which characteristic reference spectrums of certain types of pollution are stored, and is configured for example to emit an alert or trigger stoppage of the facility 30 in case of a match between a net spectrum and a prerecorded reference spectrum.

Owing to the invention, it is possible to perform rapid gamma and/or X ray measurements compatible with the monitoring or control of industrial processes. The photonic spectrometer device can be produced from commercially available elements and may be positioned in situ near or in a facility to monitor the products provided by that facility and/or control the facility.

The invention in particular may apply to the measurement of the uranium 235 content at the output of a process for manufacturing a uranium-based nuclear fuel or a process for recycling uranium. In general, the invention applies to the measurement of the content level of any radioactive element.

The invention applies to the measurement of any gamma or X ray. The spectrometers according to the invention are gamma and/or X photonic spectrometers depending on the scintillator used.

What is claimed is:

1. A photonic spectrometry device comprising:
   at least one sensor configured for detecting photons;
   at least two photon-emitting calibrating sources having different reference spectral lines; and
   a processor configured for providing, for the or each sensor a respective measurement spectrum corresponding to the measurements, made by the or each sensor, of the radiation from a product and the calibrating sources during a time interval and establishing, on the basis of the or each measurement spectrum, a corrected net spectrum by recalibrating the or each measurement spectrum so as to make, for each calibrating source, a characteristic spectral line of the respective calibrating source measured simultaneous to the measurement of the radiation from the product by the or each sensor during the time interval coincide with the reference spectral line of that calibrating source.

2. The photonic spectrometry device as recited in claim 1 wherein the processor is configured for establishing each corrected net spectrum by recalibrating the or each corresponding measurement spectrum using at least one determined recalibration affine function so as to make a measured characteristic line measured by the sensor coincide with the reference spectral line of that calibrating source for each calibrating source.

3. The photonic spectrometry device as recited in claim 1 wherein the calibrating sources are positioned outside the or each sensor.

4. The photonic spectrometry device as recited in claim 1 wherein the at least one sensor includes several identical sensors.

5. The photonic spectrometry device as recited in claim 4 wherein each sensor statistically substantially receives a same quantity of photons coming from each calibrating source for same time interval.

6. The photonic spectrometry device as recited in claim 1 further comprising a measurement pot for circulating fluid inside the pot, the pot including, outside the pot, a housing for receiving each calibrating source and a respective housing for receiving the or each sensor.

7. The photonic spectrometry device as recited in claim 1 wherein the at least two photon-emitting calibrating sources include two calibrating sources having reference spectral lines framing a characteristic spectral line of an element to be detected.

8. The photonic spectrometry device as recited in claim 7 wherein the element to be detected is uranium 235.

9. A method of operating the photonic spectrometry device as recited in claim 1 comprising:
   measuring, by the photonic spectrometry device, the uranium content of hydrofluoric acid resulting from the manufacture of uranium oxide; measuring, by the photonic spectrometry device, the content level of at least one radioisotope of the effluents of a radioactive recycling facility; or measuring, by the photonic spectrometry device, before discharge, the content level of at least one radioisotope of the effluents of a radioactive material treatment plant.

10. A photonic spectrometry method comprising the following steps:
    establishing a measurement spectrum from measurement signals provided by a photon-sensitive sensor for a time interval in which radiation is measured for a product emitting radiation and at least two photon-emitting calibrating sources having different reference spectral lines; and
    establishing a corrected net spectrum by recalibrating the measurement spectrum based on at least one recalibration function determined so as, for each calibrating source, to make a characteristic spectral line of the respective calibrating source measured simultaneous to the measurement of the radiation from the product by the sensor during the time interval coincide with the reference spectral line of that calibrating source.

11. The photonic spectrometry method as recited in claim 10 wherein the radiation is measured in the presence of two calibrating sources, and each elementary spectrum is established by recalibrating the or each measurement spectrum using at least one affine function, based on the recalibration of each calibrating source.

12. The photonic spectrometry method as recited in claim 10 wherein a global spectrum is established as the summation of corrected net spectrums obtained by recalibrating the measurement spectrums established through simultaneous measurements of a same product emitting radiation during the same time interval by several identical sensors.

13. A photonic spectrometry method, comprising the following steps:
    simultaneously measuring the radiation in a time interval using several photon-sensitive identical sensors for a same product emitting radiation and at least one photon-emitting calibrating source shared by the sensors;
    establishing a respective measurement spectrum from measurement signals provided by each sensor for the time interval; and
    establishing a corrected net spectrum from each measurement spectrum by recalibrating each measurement spectrum using a recalibration function determined so as to make a characteristic spectral line of the at least one photon-emitting calibrating source measured simultaneous to the measurement of the radiation from the product by each sensor during the time interval coincide with the reference spectral line of the or each calibrating source.

14. The photonic spectrometry method as recited in claim 13 wherein the radiation is measured in the presence of two calibrating sources, and each elementary spectrum is established by recalibrating the or each measurement spectrum using at least one affine function, based on the recalibration of each calibrating source.

15. The photonic spectrometry method as recited in claim 13 wherein a global spectrum is established as the summation of corrected net spectrums obtained by recalibrating the measurement spectrums established through simultaneous measurements of a same product emitting radiation during the same time interval by several identical sensors.

* * * * *